United States Patent [19]
Magneson

[11] 3,917,094
[45] Nov. 4, 1975

[54] BOAT LOADER
[76] Inventor: Archie K. Magneson, 5408 Hughitt Ave., Superior, Wis. 54880
[22] Filed: Sept. 30, 1974
[21] Appl. No.: 510,603

[52] U.S. Cl. .......................... 214/450; 9/34; 212/55
[51] Int. Cl.² .................................................. B60R 9/00
[58] Field of Search ....... 214/75 H, 86 A, 450, 135, 214/141, 146.5; 224/42.1 H; 212/8 R, 46 B, 70, 55, 4, 1 R, 71; 9/34, 39; 254/3 R, 6 R

[56] References Cited
UNITED STATES PATENTS

| | | | |
|---|---|---|---|
| 2,333,092 | 11/1943 | Davidson | 214/135 R |
| 2,633,999 | 4/1953 | Blackman et al. | 214/75 H |
| 2,993,605 | 7/1961 | Smith | 212/55 |
| 3,072,274 | 1/1963 | Atwell | 214/450 |
| 3,139,203 | 6/1964 | Borger | 214/450 |
| 3,275,296 | 9/1966 | Meyer | 212/8 R |
| 3,369,670 | 2/1968 | Tourneau | 212/55 |

*Primary Examiner*—Robert J. Spar
*Assistant Examiner*—Ross Weaver

[57] ABSTRACT

A boat lifter is provided capable of lifting the transom end of an inverted rowboat or the like upwardly into engagement with a clamp mounted upon a post supported by a trailer hitch or the like at the rear of a car. This lifter may be either mounted on the post, or on a vertical mast on a carriage movable along the ground. With the latter structure, the forward end of the boat may be lifted as well as the transom end.

11 Claims, 15 Drawing Figures

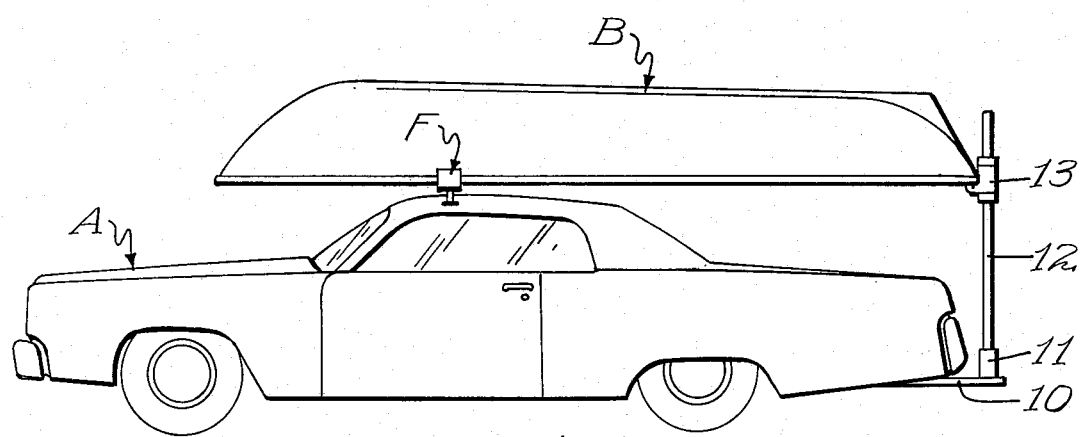
FIG. 1
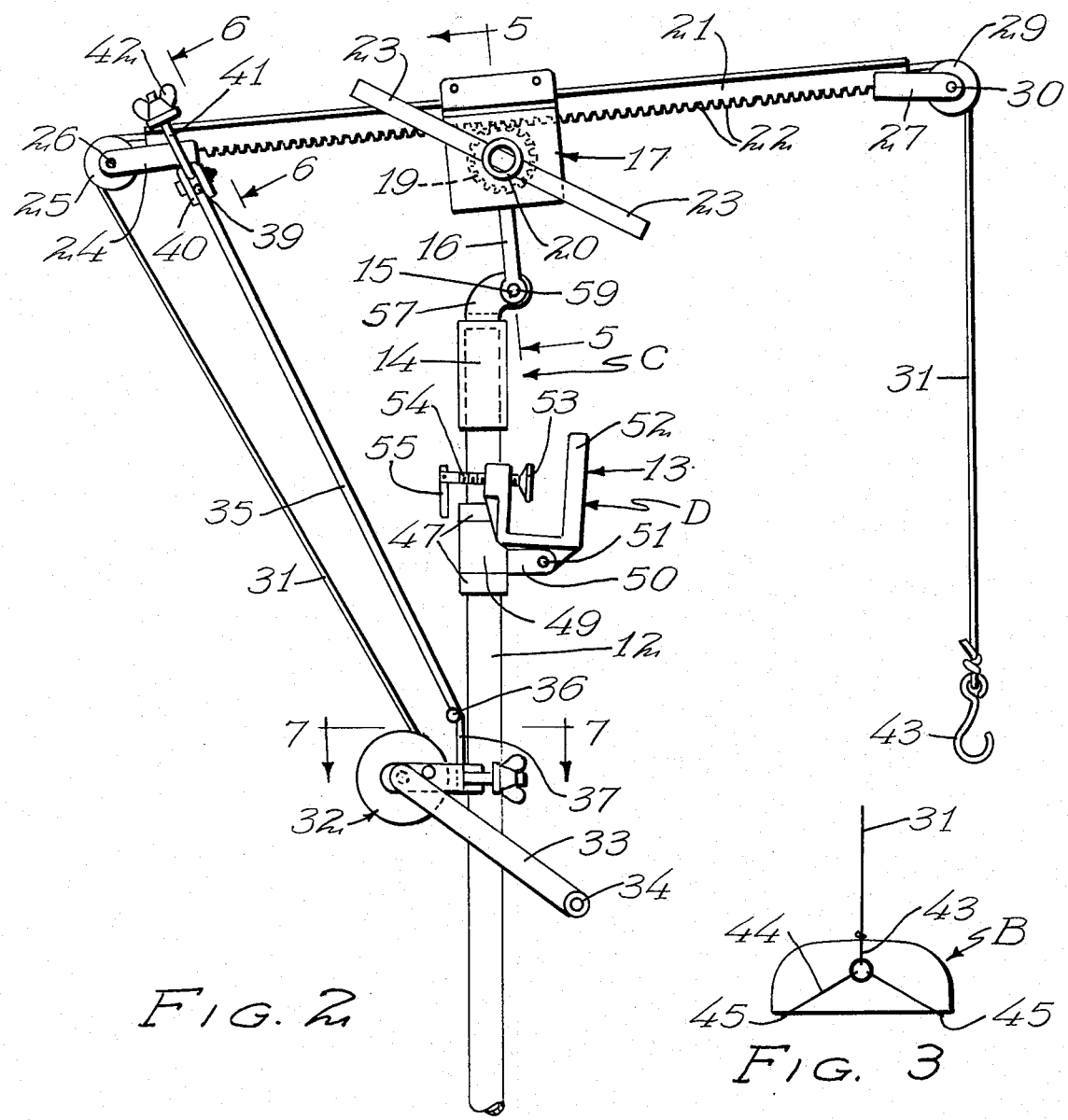
FIG. 2
FIG. 3

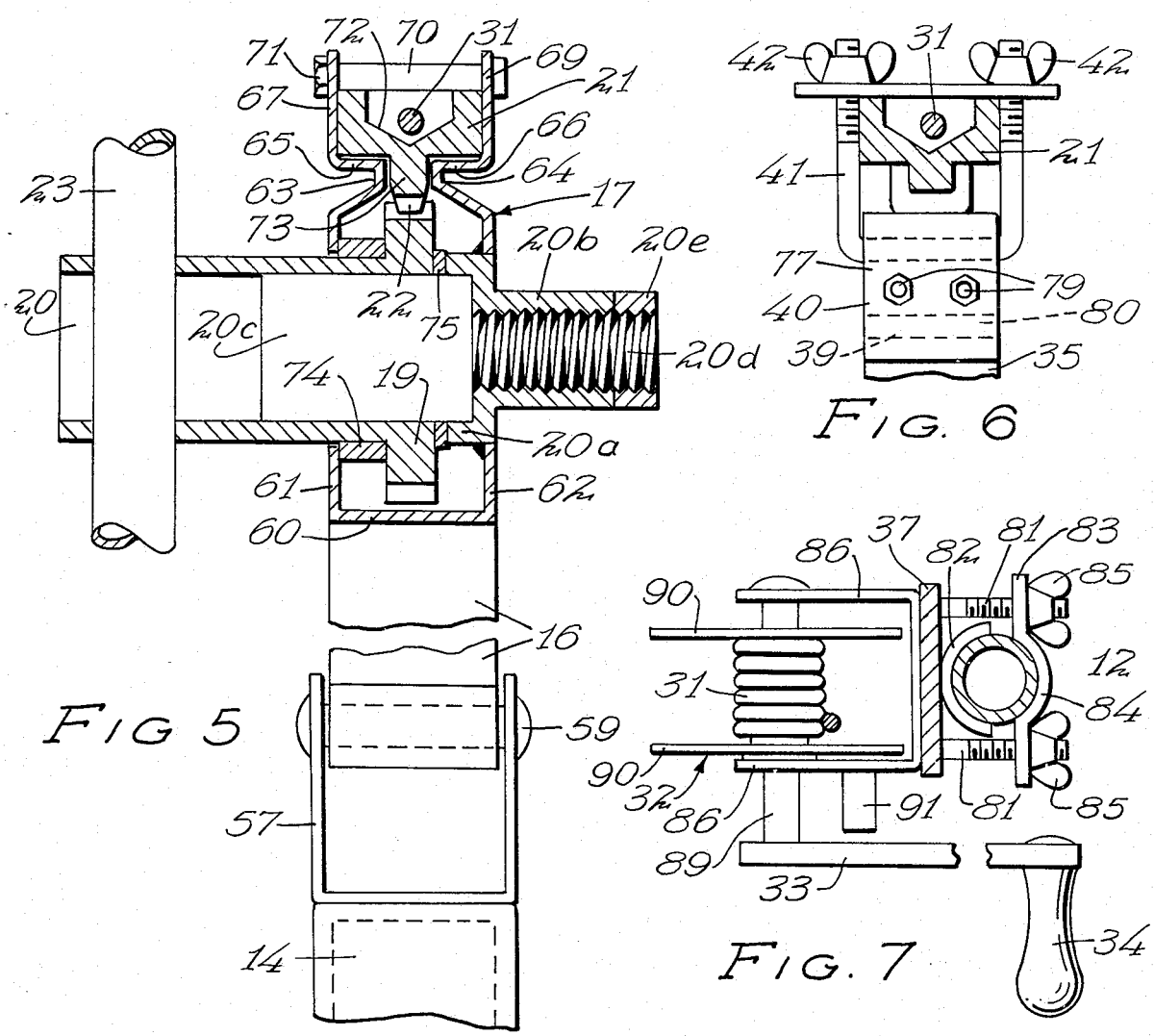
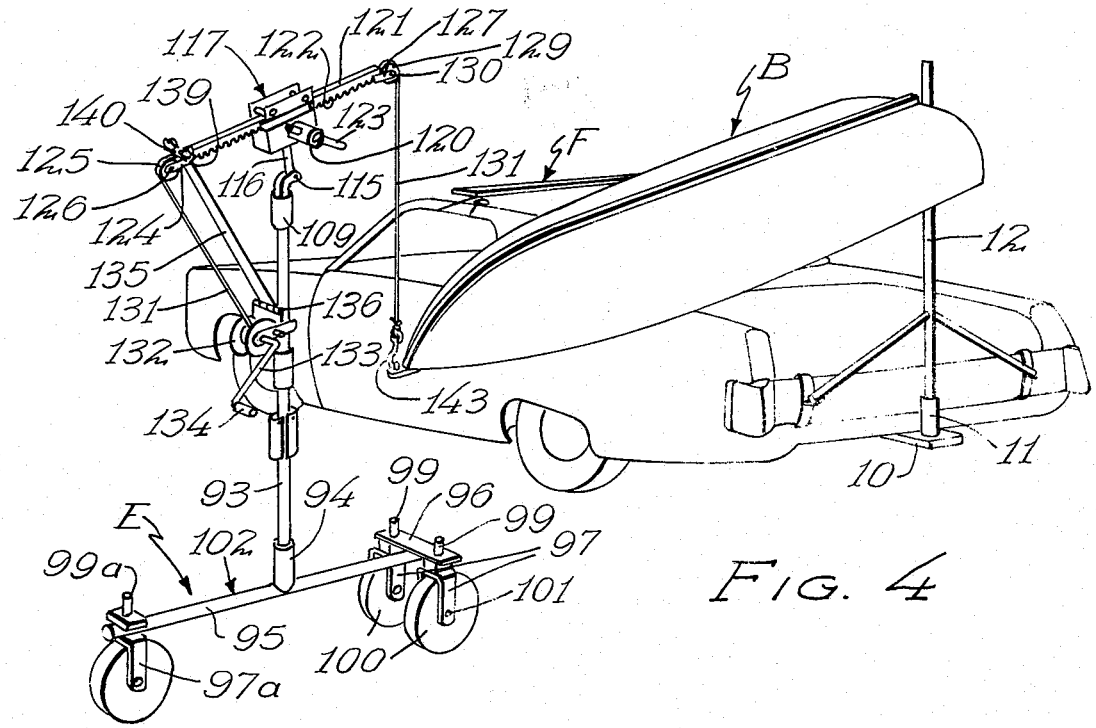

3,917,094

BOAT LOADER

This invention relates to an improvement in Boat Loader, and deals particularly with an apparatus for use and assistance to raise the transom end of the boat upwardly into engagement with a clamp at the top of the vertical post extending upwardly from the rear of a vehicle.

BACKGROUND OF THE INVENTION

Certain previous patents, such as U.S. Pat. No. 2,772,799 issued Dec. 4, 1956 to Bridinger discloses a boat carrier having a vertical post mounted on the rear of a vehicle and a clamp at the upper end thereof. The clamp is pivotally supported so that the transom of the boat may be lifted while the boat is at an angular relation to the car. Once the transom end of the boat is clamped, the front of the boat which is pivotally supported at its rear end, is raised and swung onto a cradle near the front end of the vehicle.

U.S. Pat. No. 2,895,628 issued to Leonard J. Gebhart shows a structure which is somewhat similar to that shown in the Bridinger patent, but shows a clamp which is vertically adjustable upon the vertical standard at the back of the vehicle. As a result, the elevation of the clamp may be varied so that the boat maintains a generally level position when the vehicle is in movement.

SUMMARY OF THE INVENTION

It has been found that some boats, which are light enough in weight in order to ride properly on the top of a vehicle in the manner shown in either of these patents are still too heavy at the transom end to be readily lifted onto the clamp supported at the top of the supporting post at the rear of the vehicle. It is a purpose of the present invention to provide an apparatus capable of lifting the rear end of the boat in order to simplify its engagement in the clamp so that it may be secured in place prior to swinging the front end of the boat over the front of the vehicle.

I have found that by providing a cap mounted upon the vertical post at the rear of the vehicle, which pivotally supports a gear housing, much of the previous difficulty can be overcome. The gear housing contains a pinion which is engageable with an elongated rack, which rack is longitudinally slideable in the gear housing. By rotating the pinion, the rack may be moved longitudinally so as to draw the transom end of the boat toward the clamp which is supported beneath the gear housing.

In general, the device includes the gear housing which is pivotally supported to a cap at the top of the post, and a winch which is clamped to the post beneath the boat clamp. This winch is pivotally connected to one end of the rack by means of a pivotal link. The winch includes a rope or cable which extends over a pulley supported at one end of the rack which is adjoining the pivotal connection with the link, and extends longitudinally of the rack and over a second pulley at the opposite end of the rack. The end of the rope is preferably provided with a hook or other such means for attachment to the rear of the boat, usually by means of a sling or the like.

The device is operated by lowering the hook end of the rope or cable and engaging it with the sling adjoining the transom of the boat. The winch is then operated to raise the rear end of the boat to an elevation above the level of the clamp. The pinion within the gear housing is then rotated in a manner to move the rack longitudinally and to draw the rear end of the boat toward the supporting clamp. When it is in position above the clamp, the transom of the boat may be lowered until it engages in the clamp, and the clamp secured to the boat transom.

In a modified form the vertical pipe section supporting the socket attached to the gear box could be offset from the top of the vertical post by a bracket, and the boat clamp can be mounted on the top of the vertical pipe, rather than slideably supported thereon.

These and other objects and novel features of the present invention will be more clearly and fully set forth in the following specification and claims.

BRIEF DESCRIPTION OF THE DRAWINGS

FIG. 1 is a side elevational view of a vehicle with a boat supported thereupon.

FIG. 2 is an elevational view of the apparatus for raising the transom end of the boat.

FIG. 3 is a diagrammatic rear end view of the boat in inverted position with the supporting sling attached thereto.

FIG. 4 is a perspective view of a modified form of construction showing the device capable of lifting the forward end of the boat as well as the rear end thereof.

FIG. 5 is a sectional view through the gear box, the position of the section being indicated by the line 5—5 of FIG. 2.

FIG. 6 is a sectional view on the line 6—6 of FIG. 2.

FIG. 7 is a sectional view on the line 7—7 of FIG. 2.

DESCRIPTION OF THE PREFERRED EMBODIMENT

Figures 9, 10:
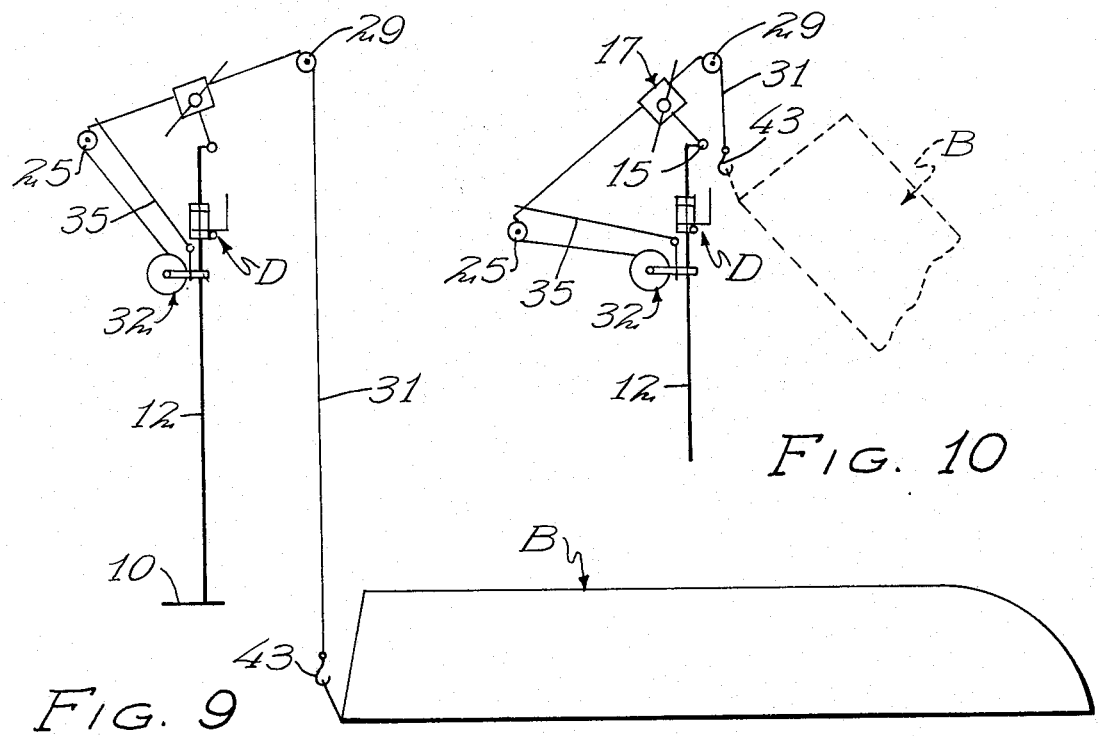
FIG. 9 is a diagrammatic view of the apparatus and boat at the start of the lifting operation.
FIG. 10 is a view similar to FIG. 9 showing the rear of the boat in an elevated position.

FIG. 1 of the drawings indicates in general a passenger car "A" which is supporting a boat "B". The passenger car A is provided with a bumper hitch 10 provided with a socket 11 for accommodating a vertical post 12. A clamp 13 similar to that shown in the previously mentioned patent to Gebhart is mounted upon the post 12 beneath the upper extremity of the post.

FIG. 2 of the drawings indicates in general the mechanism or device "C" which assists in raising the transom end of the boat. This device includes a cap 14 which is designed to fit over the top of the post 12 in telescoping relation thereto, and at its upper end to support a pivot 15 acting through a pivot arm 16 to support a gear box which indicated in general by the numeral 17.

While the details of construction of the gear box will be later described, in order to understand the problem involved, FIG. 2 indicates a pinion 19 mounted upon a hollow shaft 20 which is engageable with an elongated gear rack 21 having teeth 22 throughout the length of its lower edge in order to engage the teeth of the pinion 19. Oppositely directed handle bars 23 are mounted upon the hollow shaft 20 exteriorly of the gear box 17, and the pinion 19 is rotatably supported on the shaft 20 to be rotated by the handle bars 23.

The gear rack 21 is provided at one end with a bracket 24 which is bifurcated to accommodate a pulley 25 mounted upon a pivot pin 26. A bracket 27 at the other end of the gear rack 21 is also designed to support a pulley 29 on a pivot 30. As will be later seen in detail, a rope or cable 31 extends over the pulley 29 and longitudinally of the gear rack 21, the rope actually extending through a groove in the upper surface of the rack which will be described. The rope or cable 31 is secured to a winch 32 which is clamped to the post 12 and which is provided with a crank arm 33, and crank handle 34 by means of which the rope or cable may be wound or unwound from the winch 32. A link comprising a strap 35 is hingedly connected at 36 to a plate 37 anchored to the post 12. The link 35 is also pivotally connected at 39 to a bracket 40 secured by a U-bolt 41 to the end of the rack 21 by wing nuts 42. Alternatively the link 35 could be merely pivotally attached to the bracket 24, the axes of the pivots 36 and 39 being parallel.

A hook 43 is shown attached to the free end of the cable 31 although this is obviously a matter of choice. FIG. 3 shows a sling 44 anchored at its ends 45 to the rear of the boat B near opposite sides thereof. If desired, the sling 44 could be directly connected to the line 31, or the line 31 could be connected to an anchoring member on the rear of the transom of the boat if the anchoring member were such to avoid interference with the use of the boat with an outboard motor.

A clamp "D" or 13 which is of the general type shown in the Gebhart patent previously referred to is pivotally supported between collars 47 on the post 12. The bracket D includes a sleeve 49 having a pair of transversely extending arms 50 which are pivotally supported at 51 to a U-shaped bracket 52. Clamping plates 53 mounted on the ends of threaded shafts 54 are rotated by pivotal arms 55 so as to clamp the clamping plates 53 against the transom of the boat, which is held in position by the outer side of the U-shaped clamping member 52.

The gear case 17 is formed as best illustrated in FIG. 5 of the drawings. FIG. 5 illustrates the post cap 14 connected to the U-shaped bracket member 57. A pivot 59 extends through the brackets 57 and pivotally connects it to the gear box support 16. The gear box 17 is provided with a bottom wall 60 connected to opposite side walls 61 and 62. The side walls 61 and 62 are offset inwardly as indicated at 63 and 64 to provide coplanar supports 65 and 66 respectively which are designed to support the gear rack 21. The walls 61 and 62 extend upwardly from the horizontal portions 65 and 66 to provide upwardly extending said walls 67 and 69. The walls 67 and 69 are held in spaced parallel relation by spacing sleeves 70 through which bolts 71 extend to hold the structure together.

As indicated in FIG. 5, the rack is provided with a generally V-shaped groove 72 in its upper surface to accommodate the rope 31. The central downwardly projecting rib 73 supports the rack teeth 22 which engage the pinion 19.

A bearing sleeve 74 is provided within the gear housing 17 in order to rotateably support the shaft 20 and the pinion 19. A thrust bearing 75 is provided to prevent longitudinal movement of the shaft 20.

A short sleeve 20a is in opposed relation to the hollow shaft 20 and welded to the housing 17. A concentric internally threaded sleeve 20b of reduced diameter forms an extension thereof. A cylindrical shaft member 20c is mounted within the sleeve 20 and is provided at one end with a smaller diameter concentric shaft 20d having external threads extending through the sleeve 20b. The shaft 20d is secured in fixed relation by a nut 20e.

With reference to FIG. 6 of the drawings, the brackets 40 may be welded or otherwise secured to the end of the rack 21, but in the arrangement illustrated is removeable. The bracket 40 includes a pair of similar bracket plates, one of which is indicated at 77 and which are bolted together as indicated by the bolt 79. The bracket 40 includes a pivot 80 which is open at its lower end to accommodate the rounded upper pivot end 39 of the strap 35. This structure is not believed of particular importance in view of the fact that any means of pivotally connecting the link 35 to the end of the rack 21 would suffice.

Figure 8:
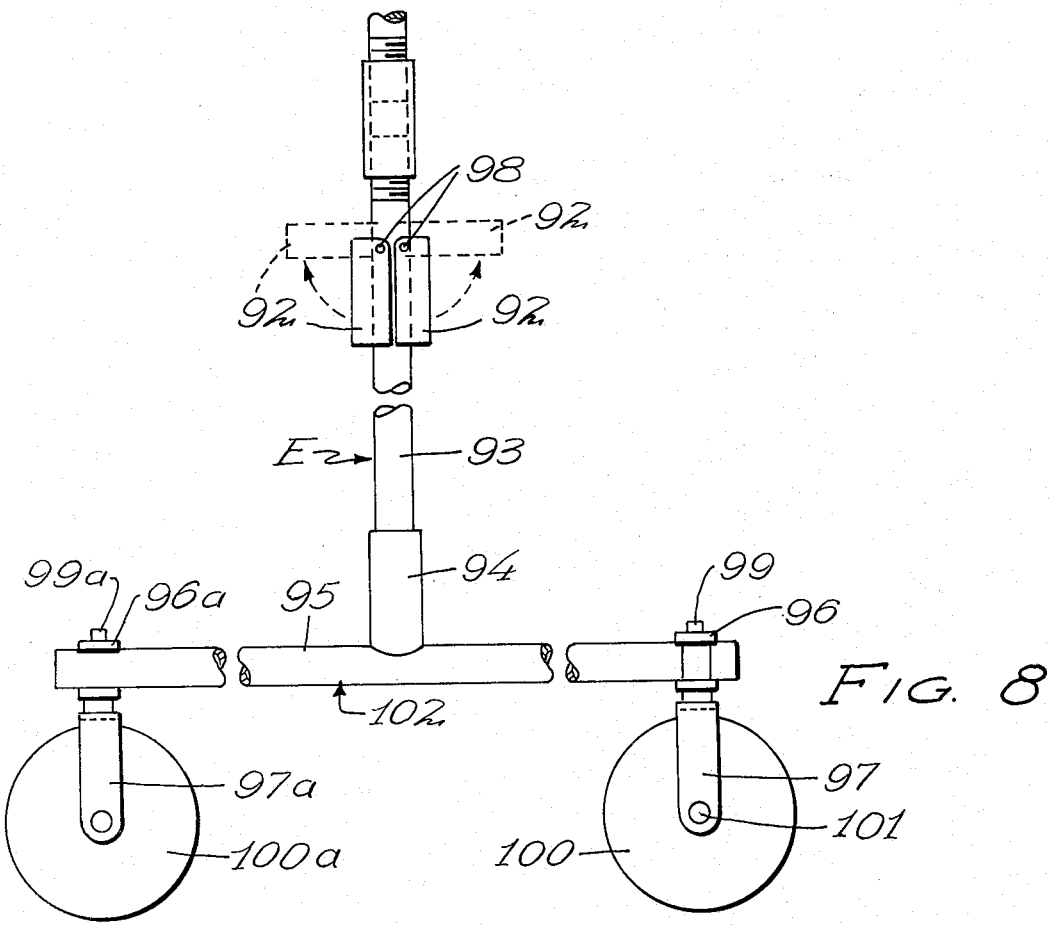
FIG. 8 shows a modified form of construction.
Figure 11:
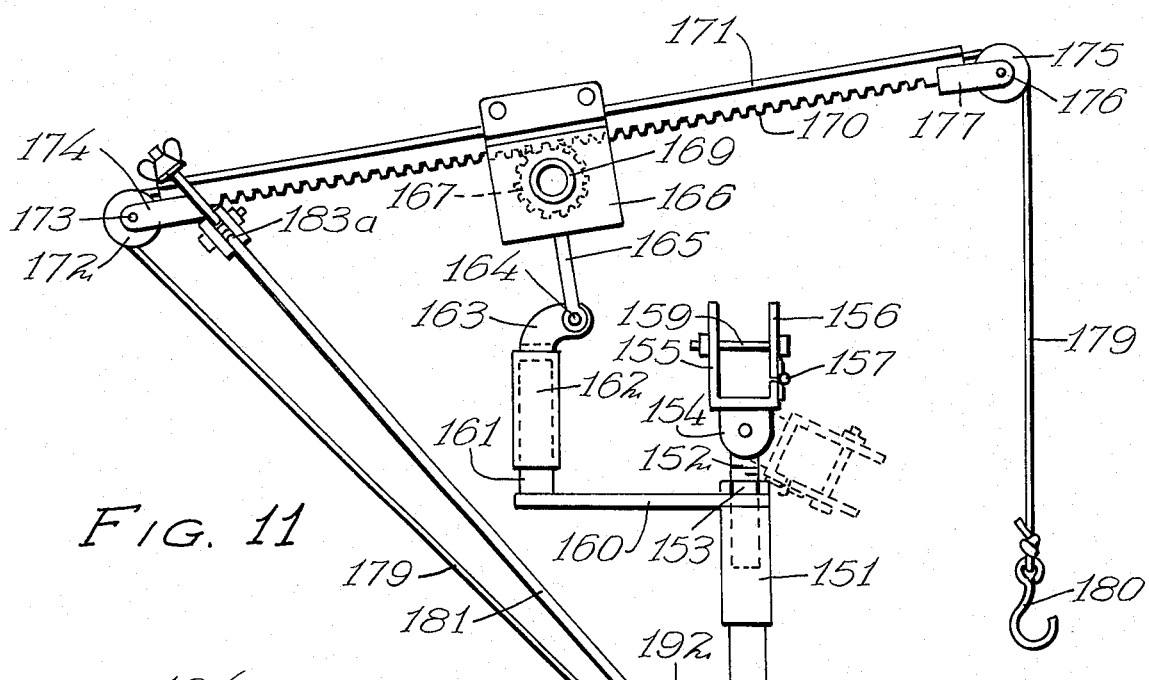
FIG. 11 is an elevational view of another modified form of construction.

FIGS. 4 and 8 of the drawings disclose a modified form of construction which is designed to accomplish much the same thing, but is also capable of raising ends of the boat rather than a single one. In other words, instead of placing the gear box 17 and the winch 32 on the same post that carries the boat transom clamp C, they are mounted upon a post 93 supported in a vertical socket 94 on an elongated member 95 having one end clamped or otherwise secured to a cross member 96. U-shaped brackets 97 are provided with vertically extending pivots 99 which extend through the cross member 96 in spaced relation.

Wheels 100 are pivotally supported upon pivots 101 so that the carriage indicated in general by the numeral 102 can roll along the ground in any direction. A single U-shaped bracket 97a is provided with a vertical pivot 99a extending through the other end of the member 95 to provide a tricycle-like support for the vertical post 93.

The vertical post 93 is substantially equal in height to the post 12 which has been previously described. The post 93 is provided with identical equipment to that which has been described. In other words, a cap 109 identical to the previously described cap 14 fits on the top of the post 93 and acts in the same manner as the cap 14 previously described. In view of these facts, the applicant is applying numerals to the mechanism shown in FIG. 4 which are identical with those previously used in conjunction with the apparatus C with the exception of the fact that the numeral 1 has been added before the number. In other words, the cap 109 is connected by a pivot 115 to a supporting arm 116 which supports the gear box mechanism indicated in general by the numeral 117. The gear housing 117 includes a pinion which is not illustrated in the drawings and which engages the teeth 122 of the rack 121. A shaft of the pinion is indicated at 120 and is rotated by arms 123, one of which has been broken away to disclose the mechanism housing.

A bracket 124 is mounted on one end of the rack 121 and supports a pulley 125 supported by a pinion 126. A second bracket 127 is mounted at the opposite end of the rack 121 and supports a pulley 129 on a pivot 130. A cable 131 extends over the pulley 129 and through a groove in the rack which is not illustrated in the drawings, but is similar to the groove 72. The rope or cable 131 is connected to a winch 132 operated by a crank arm 133 having a handle 134.

A supporting strap 135 is pivoted at its lower end 136 to the winch, and the link 135 is hingedly connected at 139 to the bracket 140 which is similar to the manner in which the pivot 39 is connected to a bracket 40 as shown in FIG. 2.

A hook or other attachment 143 may be connected to the free end of the rope or cable 131. The winch 132 operates in the same manner as the winch 32 previously described, and may be used for raising and lowering the hook end 143 of the cable 131.

In the operation of this apparatus, the lifting unit which may be indicated in general by the letter "E", may be reeled in a close proximity to the post 12, either before or after the hook 143 has been attached to the transom end of the boat B. The mobility of the carriage permits the inverted boat to be lifted by the transom end, and the carriage rolled in close proximity with post 12. Accordingly, the device shown in FIG. 4 may act to lift the transom end of the boat and insert it into the clamp D in the same manner as if the cap 109 were on the top of the post 12. As a matter of fact, the engagement of the transom end of the boat with the clamp D is somewhat simplified by the fact that the carriage is capable of moving so that the boat transom may be more readily moved directly above the clamp.

FIG. 4 of the drawings shows the manner in which the front end of the boat may be lifted, and much of the difficulty in raising and swinging the boat onto the car top may be eliminated. The carriage E may be low enough to extend beneath the car, so that the carriage may be rolled under the car, preferably forward of the front wheels, and swung onto the car top support "F" mounted in any suitable manner on the top of the car. Any specific positioning may be done by merely moving the front of the boat to one side or the other to center the boat with the vehicle. FIG. 8 of the drawings shows the post 93 equipped with a pair of handles 94 pivotally connected thereto at 95. These handles are capable of being swung outwardly into the dotted line position shown in this figure for use in manipulating the carriage E. The handles E also assist in holding the post 93 upwardly, and prevent tilting of the carriage and post as it is moved along the lines.

FIG. 9 is a diagrammatic view showing the general arrangement of the apparatus before the start of the lifting operation. The gear rack is shown in a generally intermediate position. Obviously, the gear rack may be operated to extend the pulleys so that the rope or cable 31 will extend to a greater distance from the post 12.

FIG. 10 indicates diagrammatically the transom end of the boat B in an elevated position before it is inserted into the clamp D.

FIGS. 11 through 15 disclose a modified form of construction in which the pole or post 150 may be either attached to the bumper hitch of the vehicle, or may be mounted upon the carriage shown in FIG. 8. A cap 151 is secured to the upper end of the post 150 by means of a bolt 152 which is threaded into the post 150 and the cap 151 and is held in place by a nut 153. The bolt 152 supports a pivot 154 which supports U-shaped member 155. The U-shaped member 155 is provided with a hinged side 156 connected to the remainder of the U-shaped member by a hinge 157. A bolt 159 which is designed to extend through an aperture in the rear end of the boat secures the sides of the U-shaped member together. Obviously, one side of the U-shaped member may be hinged down to facilitate the engagement with the rear of the boat, and then the side 156 may be hinged upwardly and the bolt 159 inserted to hold the boat firmly in place.

An arm 160 extends laterally from the cap 151 and supports a post section 161 designed to accommodate a cap 162 which may be identical to the cap 14 previously described. The cap 162 supports an arm 163 pivotally connected at 164 to an arm 165 which supports the gear box 166 which may be identical to the gear box 17.

A pinion 167 supported upon a pivot shaft 169 engages the teeth 170 of the gear rack 171. A pulley 172 is pivoted at 173 to a bracket 174 on one end of the rack 171. A second pulley 175 is pivoted at 176 to a bracket 177 secured to the opposite end of the rack 171 from that which supports the pulley 172. A rope 179 is connected to a hook 180 or other suitable means for lifting the boat or other device.

Figure 12:
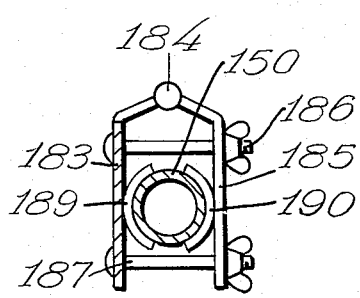
FIG. 12 is a horizontal sectional view through the post, the position of the section being indicated by the line 12—12 of FIG. 11.
Figure 13:
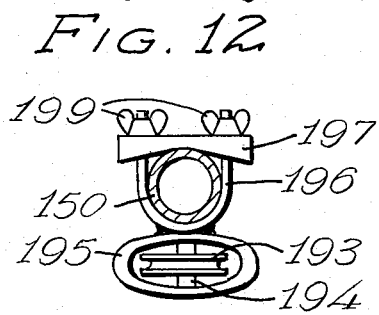
FIG. 13 is a horizontal sectional view through the pipe, the position of the pipe being indicated by the line 13—13 of FIG. 11.
Figure 14:
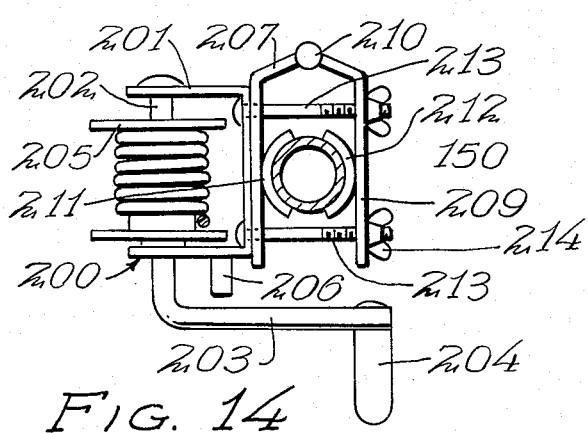
FIG. 14 is a horizontal sectional view through the pipe or post, the position of the section being indicated by the line 14—14 of FIG. 8.
Figure 15:
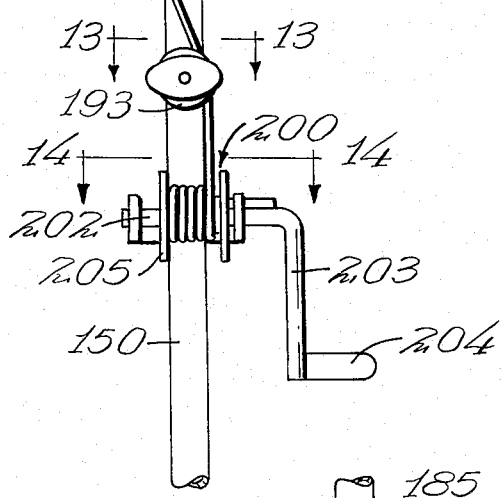
FIG. 15 is an elevational view of a detail portion of the device, the position of the view being indicated by the arrows 12—12 of FIG. 8.

A link 181 is pivotally connected at its lower end 182 to a bracket plate 183 mounted upon a post 150 and is pivotally connected at 183a to the bracket 174. As indicated in FIG. 12 of the drawings, the plate 183 is hinged at 184 to a complimentary plate 185, the plates 183 and 185 being clamped together by clamping bolts 186 and 187. Arcuate post engaging plates 189 and 190 partially encircle the post 150 and are secured to the plates 183 and 185 respectively and hold the plate 183 securely in place.

A pulley 191 is pivotally connected at 192 to the arm 181 and guides the rope 179 to a second pulley 103 (see FIG. 13) pivotally supported at 194 to a pulley support 195 welded to the exterior center of a U-bolt 196. The parallel ends of the U-bolt 196 extend through a clamping plate 197 and the pulley is clamped to the post 150 by the wing nuts 199.

A winch 200 (see FIG. 14) includes a U-shaped frame 201 which supports the drum shaft 202 extending through the parallel sides of the U-shaped bracket 201. A crank arm 203 is secured to the end of the pivot shaft 202 and supports a handle 204 by means of which the drum shaft 202 may be rotated. The spool or reel 205 is secured to the shaft 202 and may be rotated by the crank whenever the crank arm 203 is not in engagement with the stop 206 in a previous structure.

The winch 200 is supported by a clamp similar to that used to mount the plate 183. The base of the U-shaped member is secured to one side 207 of the clamp which is hingedly connected to a second clamping member 209 by a pivot 210. The plates or clamping sides 207 and 209 are welded or otherwise secured to arcuate pipe clamping plates 211 and 212 designed to engage the post 150. Clamping bolts 213 provided with wing nuts 214 secure the winch in a fixed position on the post 150.

The structure functions much in the manner of the previous device. When the winch 200 is actuated, the rope 174 acts to lift or lower the hook 180, raising or lowering the object grasped. When the hook 180 nears the pulley 175, the transom of the boat may be inserted into the clamp between the plates 156 and 155. During this time, the bolt 159 is removed and the side 156 may be pivoted downwardly to more readily engage the transom. By inserting the bolt 159 through the transom of the boat, the rear of the boat may be mounted upon the post 150. The front of the boat may then be swung on top of the vehicle much in the manner illustrated in FIG. 1 of the drawings, and the loading operation is complete.

In accordance with the Patent Statutes, I have described the principles of construction and operation of my Boat Loader, and while I have endeavored to set forth the best embodiments, I desire to have it understood that obvious changes may be made within the scope of the following claims without departing from the spirit of my invention.

I claim:

1. A boat lifter including:
   a post,
   means supporting said post in a substantially vertical position,
   a gear box pivotally connected to the top of said post,
   an elongated gear rack extending through said gear box and longitudinally movable with respect thereto,
   pulleys at opposite ends of said gear rack,
   a winch supported by said post spaced below said gear box,
   a cable means secured to said winch and extending upwardly over one pulley at one end of said rack, extending longitudinally of said rack, and over said other pulley to extend downwardly for attachment to a boat or the like,
   a link pivotally connected at one end to said post and pivotally connected to said rack near said one pulley,
   a gear in said gear box engaging said teeth or said rack for moving the same, and
   means for operating said gear in said gear box.

2. The structure of claim 1 and including a hook on the downwardly extending end of said cable.

3. The structure of claim 1 and including a boat transom clamp secured to said post above said winch.

4. The structure of claim 1 and in which movement of said rack moves said other pulley toward or away from said post.

5. The structure of claim 1 and in which said rack is grooved along its upper side to accommodate said cable.

6. The structure of claim 1 and in which said post is secured to means on the rear end of a vehicle.

7. The structure of claim 6 and including a car top carrier on the top of said vehicle near the forward end thereof adapted to support the forward end of said boat.

8. The structure of claim 1 and in which said post is mounted on a carriage for movement therewith.

9. The structure of claim 8 and in which said carriage is elongated and is supported by pairs of wheels at opposite ends thereof, said post being secured intermediate said pairs of wheels.

10. The structure of claim 9 and in which said post is mounted in a vertical socket on said carriage.

11. The structure of claim 1 and in which said link is pivotally connected to a clamp mounted on said post, and said winch is separately secured to said post.

* * * * *